(12) United States Patent
Wang et al.

(10) Patent No.: US 11,734,154 B2
(45) Date of Patent: Aug. 22, 2023

(54) DELTA DEBUGGING METHOD AND SYSTEM BASED ON PROBABILITY MODEL

(71) Applicant: PEKING UNIVERSITY, Beijing (CN)

(72) Inventors: Guancheng Wang, Beijing (CN); Ruobing Shen, Beijing (CN); Yingfei Xiong, Beijing (CN); Lu Zhang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 74 days.

(21) Appl. No.: 17/462,059

(22) Filed: Aug. 31, 2021

(65) Prior Publication Data
US 2023/0014615 A1    Jan. 19, 2023

(30) Foreign Application Priority Data
Jul. 2, 2021 (CN) .......................... 202110753465.4

(51) Int. Cl.
*G06F 8/36* (2018.01)
*G06F 11/36* (2006.01)
*G06N 7/01* (2023.01)

(52) U.S. Cl.
CPC ........ *G06F 11/362* (2013.01); *G06F 11/3688* (2013.01); *G06N 7/01* (2023.01)

(58) Field of Classification Search
CPC . G06F 11/362; G06F 11/3676; G06F 11/3688
See application file for complete search history.

(56) References Cited

U.S. PATENT DOCUMENTS 10,949,337 B1 *  3/2021  Yalla ................... G06F 11/3688
2022/0198340 A1 *  6/2022  Gao ........................ G06N 7/01

OTHER PUBLICATIONS

Hannes Thanller et al., Probabilistic Software Modeling: A Data-driven Paradigm for Software Analysis, arXiv, 2019, retrieved online on Jan. 9, 2023, pp. 1-12. Retrieved from the Internet: <URL: https://arxiv.org/pdf/1912.07936.pdf>. (Year: 2019).*
Z. Xu, S. Ma, X. Zhang, S. Zhu and B. Xu, "Debugging with Intelligence via Probabilistic Inference," 2018 IEEE/ACM 40th International Conference on Software Engineering (ICSE), 2018, pp. 1171-1181, doi: 10.1145/3180155.3180237. (Year: 2018).*

(Continued)

*Primary Examiner* — Hanh Thi-Minh Bui
(74) *Attorney, Agent, or Firm* — Oliff PLC (57) ABSTRACT

A delta debugging method and system based on a probability model which includes: acquiring an initial probability model and historical test data; optimizing and iterating the initial probability model through the historical test data to obtain an optimized and iterated probability model; and performing delta debugging on a target program containing multiple lines of code based on the optimized and iterated probability model to obtain a debugging result that meets a first preset condition. Therefore, by adopting the embodiment of the present application, the initial probability model can be continuously optimized and iterated through the historical test data, and the target program can be debugged based on the optimized and iterated probability model, so that the debugging result can be improved, or the compression amount of the size of the target program can reach a target compression amount, or the debugging time can be greatly reduced.

9 Claims, 2 Drawing Sheets

(56) References Cited

OTHER PUBLICATIONS

N. Veira, Z. Poulos and A. Veneris, "Searching for Bugs Using Probabilistic Suspect Implications," in IEEE Transactions on Computer-Aided Design of Integrated Circuits and Systems, vol. 39, No. 12, pp. 5267-5280, Dec. 2020 (Year: 2020).*

* cited by examiner fig.1 fig.2

DELTA DEBUGGING METHOD AND SYSTEM BASED ON PROBABILITY MODEL

TECHNICAL FIELD

The present disclosure relates to the technical field of software debugging; in particular, the present disclosure relates to a delta debugging method and system based on a probability model.

BACKGROUND

The delta debugging technology can automatically reduce given test cases while retaining specific properties, and has been widely used in fields such as compiler debugging, regression error location and software expansion solution.

Formally, the delta debugging is defined as follows. Let $\mathbb{X}$ be the universe set of objects to be reduced, $\phi: \mathbb{X} \to \{F, T\}$ is a function for judging whether a set to be tested meets specified properties, and $|X|$ is the size of the set to be tested, where $X \in \mathbb{X}$. Given a set $X \in \mathbb{X}$ to be tested and $\phi(X)=T$, the goal of delta debugging is to find a set $X^* \in \mathbb{X}$ as small as possible and $\phi(X^*)=T$. For example, in a compiler development process, the delta debugging is used to find smaller test cases that can reproduce defects. In this example, $\mathbb{X}$ is the set of all programs, X is a certain test case that exposes compiler defects and has a relatively large size, and the function $\phi$ is used to judge whether an input program can expose the same defects.

At present, the most novel delta debugging technology is based on the ddmin algorithm. The ddmin algorithm regards a certain object $X \in \mathbb{X}$ to be tested as a sequence. In each iteration of the ddmin algorithm, the ddmin algorithm disassembles X into n subsequences and then tries to delete each subsequence and its corresponding complementary set from X. In the ddmin algorithm, n starts from 2 and doubles during each iteration. In the delta debugging method based on the ddmin algorithm, a complex domain-specific structure is presupposed and the ddmin algorithm is applied in the structure. For example, the HDD algorithm assumes that a target input exists in the form of a tree structure, and the ddmin algorithm is applied to all sibling nodes at each level of the tree. The CHISEL algorithm considers the dependency relationship between elements for the input of the C programming language, and the ddmin algorithm is applied to each generated input without destroying the dependency relationship.

However, the efficiency and effect of the latest delta debugging technology still do not meet actual needs. For example, according to the team's preliminary investigation, it takes about 3 hours for the latest delta debugging tool CHISEL to reduce a C language program containing 14092 lines of code, and the program size after the reduction is more than twice the expected output.

How to improve the debugging effect and debugging efficiency of the existing delta debugging technology is a technical problem to be solved.

SUMMARY

In view of the above, it is necessary to provide a delta debugging method and system based on a probability model, a computer device and a storage medium to solve the problems of low debugging effect and low debugging efficiency of the existing delta debugging technology.

In a first aspect, an embodiment of the present application provides a delta debugging method based on a probability model, and the method includes:
acquiring an initial probability model and historical test data;
optimizing and iterating the initial probability model through the historical test data to obtain an optimized and iterated probability model; and
performing delta debugging on a target program containing multiple lines of code based on the optimized and iterated probability model to obtain a debugging result that meets a first preset condition.

In an embodiment, the first preset condition includes:
a correctness of the debugging result is larger than or equal to a first preset threshold; and/or
a compression amount of the size of the target program is larger than or equal to a second preset threshold; and/or
a reduction amount of a debugging time for delta debugging of the target program is larger than or equal to a third preset threshold.

In an embodiment, the optimizing and iterating the initial probability model through the historical test data includes:
optimizing and predicting the initial probability model through the historical test data to predict the probability of each element being retained;
selecting a subset of elements that can maximize the next test revenue based on the initial probability model during each iteration; and
testing whether the subset meets various preset performances, and updating the initial probability model based on a test result if the subset meets the various preset performances.

In an embodiment, the method further includes:
simplifying the initial probability model according to preset rules to obtain a simplified probability model, in which the preset rules include a first preset rule associated with the monotonicity of the initial probability model and a second preset rule associated with the certainty of the initial probability model;
the first preset rule includes: if a sequence fails the test, then any subsequence of the sequence will fail the test; and
the second preset rule includes: if two subsequences of the sequence pass the test, then an intersection of the two subsequences will pass the test.

In an embodiment, the method further includes:
reading the first preset rule and the second preset rule; and
in a case where the universal set meets the first preset rule and the second preset rule, determining an optimal subsequence from each subsequence of the sequence.

In an embodiment, the method further includes:
calculating an expected value of test revenue of each subsequence of the sequence; and
determining the subsequence with the maximized expected value of test revenue as a target sampling subsequence.

In an embodiment, the method further includes:
calculating a posterior probability based on historical test results; and
determining a second preset condition for updating the initial probability model according to the posterior probability, in which the second preset condition includes a preset condition for sampling and a preset condition for testing.

In a second aspect, an embodiment of the present application provides a delta debugging system based on a probability model, and the system includes:
an acquisition module, which is configured to acquire an initial probability model and historical test data;

an optimization and iteration module, which is configured to optimize and iterate the initial probability model through the historical test data acquired by the acquisition module so that an optimized and iterated probability model is obtained; and a delta debugging module, which is configured to perform delta debugging on a target program containing multiple lines of code based on the optimized and iterated probability model obtained by the optimization and iteration module so that a debugging result that meets a first preset condition is obtained.

In a third aspect, an embodiment of the present application provides a computer device including a memory and a processor, in which computer-readable instructions are stored in the memory, and when the computer-readable instructions are executed by the processor, the processor is caused to execute the above method steps.

In a fourth aspect, an embodiment of the present application provides a storage medium having computer-readable instructions stored thereon, and when the computer-readable instructions are executed by one or more processors, the one or more processors are caused to execute the above method steps.

The technical solutions provided by the embodiments of the present application may include the following advantageous effects.

In the embodiment of the present application, an initial probability model and historical test data are acquired; the initial probability model is optimized and iterated through the historical test data to obtain an optimized and iterated probability model; and based on the optimized and iterated probability model, delta debugging is performed on a target program containing multiple lines of code to obtain a debugging result that meets a first preset condition. Therefore, by adopting the embodiment of the present application, the initial probability model can be continuously optimized and iterated through the historical test data to obtain the optimized and iterated probability model, and the target program can be differentiatedly debugged based on the optimized and iterated probability model, so that the correctness of the debugging result can be improved, or the compression amount of the size of the target program can reach a target compression amount, or the debugging time of the delta debugging of the target program can be greatly reduced. It should be understood that the above general description and the following detailed description are only exemplary and illustrative, and cannot limit the present disclosure.

BRIEF DESCRIPTION OF THE DRAWINGS

The drawings, which are incorporated into the specification and constitute a part of the specification, show embodiments in accordance with the present disclosure, and are used to explain the principle of the present disclosure together with the specification.

DETAILED DESCRIPTION

Specific embodiments of the present disclosure are fully illustrated in the following description and drawings to enable those skilled in the art to practice them.

It should be noted that the described embodiments are only part of the embodiments of the present disclosure, rather than all of them. Based on the embodiments of the present disclosure, all other embodiments obtained by those skilled in the art without creative work will fall within the scope of protection of the present disclosure.

Optional embodiments of the present disclosure will be described in detail below with reference to the accompanying drawings.

Figure 1:
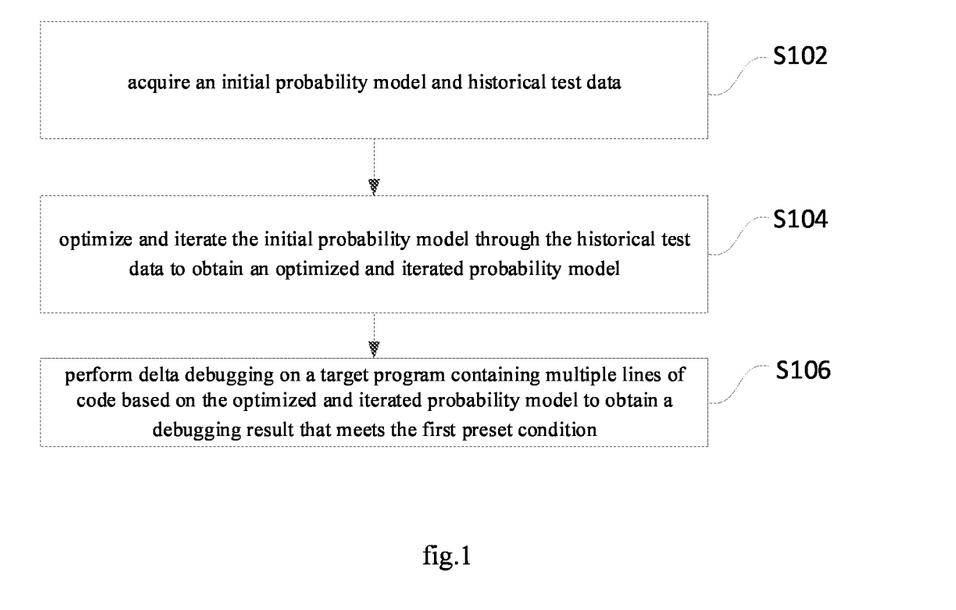
FIG. 1 is a schematic flowchart of a delta debugging method based on a probability model provided by an embodiment of the present disclosure.

As shown in FIG. 1, an embodiment of the present disclosure provides a delta debugging method based on a probability model, and the debugging method specifically includes the following method steps S102, S104 and S106:

S102: acquiring an initial probability model and historical test data.

The initial probability model in the embodiment of the present application will be described below.

1. Symbols: The debugging method provided by the embodiment of the present application achieves better efficiency and effect by replacing the ddmin algorithm module in the mainstream methods, treats the input as a sequence, and tries to find a subsequence that can pass a specified test. The universal set $\mathbb{X}$ is an n-dimensional Boolean space, and an object X represents a Boolean vector $X=\langle x_1, x_2, \ldots, x_n \rangle$, where $x_i \in \{0, 1\}$. When $x_i=1$, the $i^{th}$ element is in the subsequence; and when $x_i=0$, the $i^{th}$ element is not in the subsequence. In order to simplify the expression, a sequence X is considered as the sequence number of the contained elements, such as $\{i | x_i=1\}$, so that the set operation such as $\subseteq S$ can be applied to the sequence.

2. Existence of the optimal subsequence: Similar to related work in this field, the embodiment of the present application assumes two properties for the universal set $\mathbb{X}$. In the embodiment of the present application, the assumed properties help simplify the probability model that needs to be learned, and the complexity and correctness of the ProbDD algorithm and its system have nothing to do with the assumption of the embodiment of the present application.

1) Monotonicity: If X fails the test, any subsequences of X will fail the test; and 2) Certainty: If two subsequences pass the test, their intersection will also pass the test. Based on this, the embodiment of the present application gives the following conclusion: when the universal set $\mathbb{X}$ meets the monotonicity and certainty at the same time, there is an optimal subsequence X* that makes the following formula hold.

$$\phi(X) = \begin{cases} T & X* \subseteq X \\ F & \text{Other} \end{cases}$$

3. Initial probability model:

In the above description, the existence of the optimal subsequence is determined, and the goal of delta debugging is to find the elements contained in the optimal subsequence X*. Therefore, in the embodiment of the present application, the Bernoulli random variable $\theta_i$ is used to indicate whether the $i^{th}$ element is in $X^*$, and $p_i$ is used to indicate the probability of the $i^{th}$ element being in $X^*$, that is, $Pr(\theta_i=1)=p_i$. Therefore, the probability model used in the embodiment of the present application may be represented by an n-dimensional vector<$p_1, p_2, \ldots, p_n$>. The embodiment of the present application further assumes that the random variables are independent from each other, that is, there is $\theta_i \perp \theta_j$ for any i and j. This assumption is reasonable for the following reason: The existing delta debugging methods consider the domain-specific structure between input objects, and this structure can be captured by external methods, thereby helping the delta debugging algorithms obtain structurally independent inputs. Based on this assumption, the probability that the vector X is equivalent to the optimal solution $X^*$ is $\Pi_i p_i^{x_i}(1-p_i)^{1-x_i}$, so when each $p_i$ is equal to 1 or 0, the delta debugging algorithm of the embodiment of the present application is terminated. Based on this model, the relevant probability formula of the test result can be conveniently derived. For example, if the input X passes the test, all elements in $X^*$ will appear in X, namely:

$$Pr(\phi(X)=T)=\Pi_i(1-p_i)^{1-x_i}$$

4. Prior distribution:

Initially, the embodiment of the present application does not have prior knowledge of the accepted input, and the embodiment of the present application uniformly sets $p_1$ to $\sigma$, where $0<\sigma<1$ and $\sigma$ is the only hyperparameter of the embodiment of the present application. In addition, there are multiple ways to set $\sigma$ based on the field processed by the embodiment of the present application. For example, when the input processed by the embodiment of the present application has a fixed reduction ratio, $\sigma$ may be set as the reduction ratio; and if the subsequence after the reduction has a fixed length m, the embodiment of the present application may set $\sigma$ as m/n, where n is the length of the input sequence.

S104: optimizing and iterating the initial probability model through the historical test data to obtain an optimized and iterated probability model.

The optimization and iteration of the initial probability model in the embodiment of the present application are described as follows:

After some tests, the probability model of the embodiment of the present application can calculate the posterior probability based on historical test results and guide subsequent sampling and testing accordingly. Let the test results corresponding to a series of inputs $X_1, X_2, \ldots, X_m$ be $R_1, R_2, \ldots, R_m$, and the pair composed of the input and the corresponding test result is $T_i$. The following formula is used to calculate the posterior probability of $\theta_i$:

$$Pr(\theta_i = 1 | T_1, T_2, \ldots, T_n) = \frac{Pr(\theta_i = 1, T_1, T_2, \ldots, T_n)}{Pr(T_1, T_2, \ldots, T_n)}.$$

The basic method for calculating two joint probabilities on the right side of the above equal sign is to enumerate the universal set of subsequences and calculate the sum of the probabilities that a subsequence meets the test result. However, there is still a lack of efficient algorithms to complete counting of the above weighted models: it takes several thousand seconds for the most efficient solver to solve thousands of variables, which is very inefficient for application scenes of delta debugging. The embodiment of the present application adopts an approximate method to calculate the above posterior probability. On one hand, when the test result fails, the posterior probability is as follows:

$$Pr(\theta_i = 1|\phi(X) = F) = \frac{Pr(\theta_i = 1)Pr(\phi(X) = F|\theta_i = 1)}{Pr(\phi(X) = F)}$$

$$= \begin{cases} \frac{Pr(\theta_i = 1) * 1}{1 - \prod_i (1 - Pr(\theta_i = 1))^{1-x_i}} = \frac{p_i}{1 - \prod_i (1 - p_i)^{1-x_i}} - x_i = 0 \\ \frac{Pr(\theta_i = 1)Pr(\phi(X) = F)}{Pr(\phi(X) = F)} = Pr(\theta_i = 1) = p_i - x_i = 1 \end{cases}$$

On the other hand, when the test passes, the posterior probability is as follows:

$$Pr(\theta_i = 1|\phi(X) = T) = \frac{Pr(\theta_i = 1)Pr(\phi(X) = T|\theta_i = 1)}{Pr(\phi(X) = T)}$$

$$= \begin{cases} \frac{Pr(\theta_i = 1) * 0}{Pr(\phi(X) = T)} = 0 - x_i = 0 \\ \frac{Pr(\theta_i = 1)Pr(\phi(X) = T)}{Pr(\phi(X) = T)} = Pr(\theta_i = 1) = p_i - x_i = 1 \end{cases}$$

Based on the above formulas, for each subscript i, the embodiment of the present application updates $p_i$ after each test $\phi(X)=R$ according to the following rules:

(1) if the $i^{th}$ element is in X, $p_i$ remains unchanged;

(2) if the $i^{th}$ element is not in X and the test passes, $p_i$ is set to 0; and (3) if the $i^{th}$ element is not in X and the test fails, $p_i$ is set to $$\frac{p_i}{1 - \prod_i (1 - p_i)^{1-x_i}}.$$

1. Sampling subsequences: In the embodiment of the present application, a revenue function of the test is first defined, and then how to maximize an expected revenue will be discussed.

2. The revenue of the test: When X passes the test, the probability of the elements excluded by X is set to 0, that is, these elements will no longer be selected as inputs for testing. In order to measure how many elements can be excluded from one test, the revenue function of the test is defined as follows in an embodiment of the present application:

$$\text{gain}(X) = \begin{cases} |X^{ex}|, & \phi(X) = T \\ 0, & \phi(X) = F \end{cases};$$

Herein, $X^{ex}$ represents the set of elements excluded when the test passes, namely:

$x_i^{ex}=1$ if $fx_i=0$ and $p_i>0$

Based on the initial probability model defined in the embodiment of the present application, the expected value of the test revenue is calculated.

$E[\text{gain}(x)]=|X^{ex}|Pr(\phi(X)=T)=|X^{ex}|\Pi_i(1-p_i)^{1-x_i}.$

Therefore, the goal of sampling subsequences is to select a subsequence X that can maximize $E[\text{gain}(X)]$.

Figure 2:
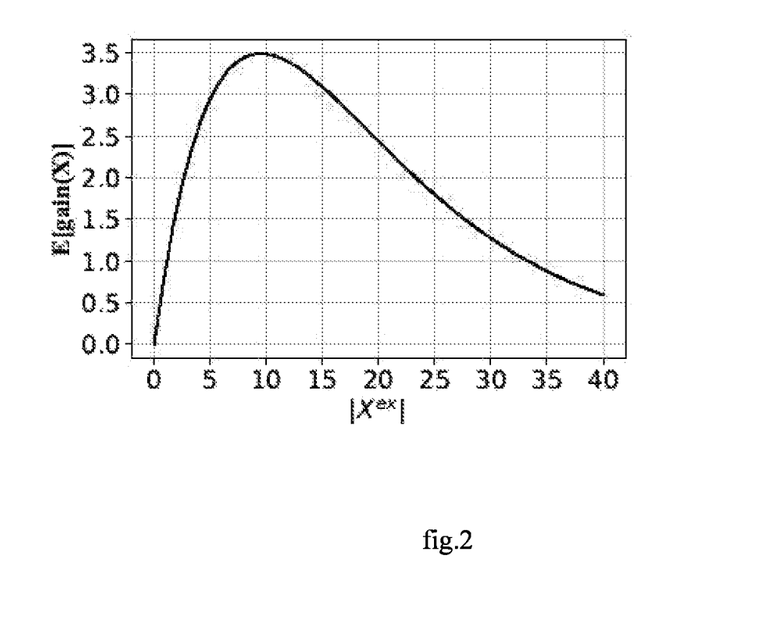
FIG. 2 is a schematic diagram showing a relationship between E[gain(X)] and $|X^{ex}|$ in a delta debugging method based on a probability model provided by an embodiment of the present disclosure.
Figure 3A:
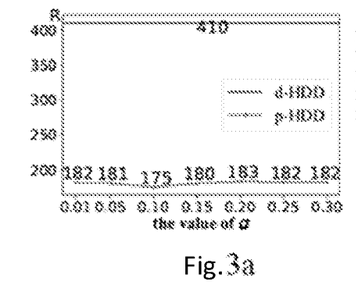
FIG. 3*a*-3*d* is a schematic diagram showing the influence of a hyperparameter σ in a delta debugging method based on a probability model provided by an embodiment of the present disclosure.
Figure 3B:
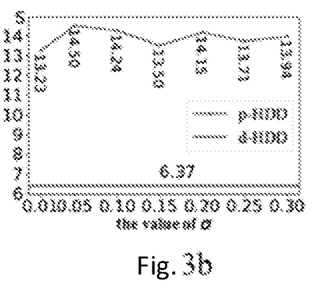
Figure 3C:
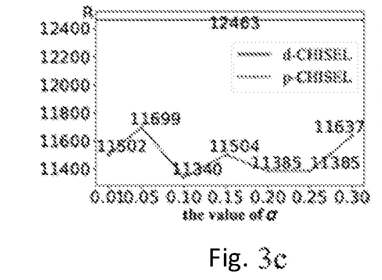
Figure 3D:
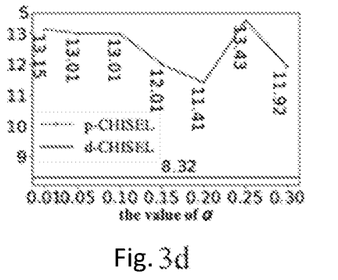

3. Maximizing the expected revenue:

For facilitating explaining how to maximize the expected revenue, in the embodiment of the present application, a simple case in which all probabilities $p_i$ are equal is first considered. In this case, any subsequence of the same size results in the same expected revenue. FIG. 2 shows the relationship between E[gain(X)] and $|X^{ex}|$ when any $p_1$ is 0.1. When more elements are removed, the expected revenue first increases and then decreases, reaching the maximum value at an inflection point. This is because E[gain(X)] consists of two parts, $|X^{ex}|$ and $\Pi_i(1-p_i)^{1-x_i}$. The first part is monotonically increasing, and the rate of increase gradually decreases. The second part is monotonically decreasing, and the rate of decrease remains consistent. Therefore, there must be a value at which the expected revenue is the largest. The embodiment of the present application further considers a case in which when the probability values are all inconsistent. The first part will not be affected by this. The second part leads to different values for different subsequences of the same size. In order to sample the subsequence that maximizes the expected revenue, elements with lower probability values need to be excluded during sampling in the embodiment of the present application.

Based on the above analysis, the following steps are executed for sampling in the embodiment of the present application. Let $X_p$ be the subsequence that passed the test for the last time.

(1) Ranking the elements in $X_p$ in ascending order based on the probability values;

(2) Excluding the elements in $X_p$ one by one in the order of the ranking until the expected revenue begins to decrease; and (3) Returning the subsequence that achieved the maximum value.

In the embodiment of the present application, the optimizing and iterating the initial probability model through the historical test data includes:

optimizing and predicting the initial probability model through the historical test data to predict the probability of each element being retained;

selecting a subset of elements that can maximize the next test revenue based on the initial probability model during each iteration; and testing whether the subset meets various preset performances, and updating the initial probability model based on a test result if the subset meets the various preset performances.

In a possible implementation, the delta debugging method provided by the embodiment of the present disclosure further includes the following steps:

simplifying the initial probability model according to preset rules to obtain a simplified probability model, in which the preset rules include a first preset rule associated with the monotonicity of the initial probability model and a second preset rule associated with the certainty of the initial probability model;

the first preset rule includes: if a sequence fails the test, then any subsequence of the sequence will fail the test; and the second preset rule includes: if two subsequences of the sequence pass the test, then an intersection of the two subsequences will pass the test.

In a possible implementation, the delta debugging method provided by the embodiment of the present disclosure further includes the following steps:

reading the first preset rule and the second preset rule; and in a case where the universal set meets the first preset rule and the second preset rule, determining an optimal subsequence from each subsequence of the sequence.

In the embodiment of the present application, the first preset rule includes: if a sequence fails the test, then any subsequence of the sequence will fail the test; and the second preset rule includes: if two subsequences of the sequence pass the test, then an intersection of the two subsequences will pass the test.

In a possible implementation, the delta debugging method provided by the embodiment of the present disclosure further includes the following steps:

calculating an expected value of test revenue of each subsequence of the sequence; and determining the subsequence with the maximized expected value of test revenue as a target sampling subsequence.

In a possible implementation, the delta debugging method provided by the embodiment of the present disclosure further includes the following steps:

calculating a posterior probability based on historical test results;

in the embodiment of the present application, if the historical test result is that the test failed, the posterior probability is as follows:

$$Pr(\theta_i = 1|\phi(X) = F) = \frac{Pr(\theta_i = 1)Pr(\phi(X) = F|\theta_i = 1)}{Pr(\phi(X) = F)}$$

$$= \begin{cases} \frac{Pr(\theta_i = 1)*1}{1 - \prod_i (1 - Pr(\theta_i = 1))^{1-x_i}} = \frac{p_i}{1 - \prod_i (1 - p_i)^{1-x_i}} & x_i = 0 \\ \frac{Pr(\theta_i = 1)Pr(\phi(X) = F)}{Pr(\phi(X) = F)} = Pr(\theta_i = 1) = p_i & x_i = 1 \end{cases};$$

in the embodiment of the present application, if the historical test result is that the test passed, the posterior probability is as follows:

$$Pr(\theta_i = 1|\phi(X) = T) = \frac{Pr(\theta_i = 1)Pr(\phi(X) = T|\theta_i = 1)}{Pr(\phi(X) = T)}$$

$$= \begin{cases} \frac{Pr(\theta_i = 1)*0}{Pr(\phi(X) = T)} = 0 & x_i = 0 \\ \frac{Pr(\theta_i = 1)Pr(\phi(X) = T)}{Pr(\phi(X) = T)} = Pr(\theta_i = 1) = p_i & x_i = 1 \end{cases};$$

and determining a second preset condition for updating the initial probability model according to the posterior probability, in which the second preset condition includes a preset condition for sampling and a preset condition for testing.

S106: performing delta debugging on a target program containing multiple lines of code based on the optimized and iterated probability model to obtain a debugging result that meets the first preset condition.

In the embodiment of the present application, the first preset condition includes:

a correctness of the debugging result is larger than or equal to a first preset threshold; and/or a compression amount of the size of the target program is larger than or equal to a second preset threshold; and/or a reduction amount of a debugging time for delta debugging of the target program is larger than or equal to a third preset threshold.

It should be noted that in the embodiment of the present application, the first preset threshold, the second preset threshold and the third preset threshold can all be preconfigured. Herein, neither of the first preset threshold, the second preset threshold and the third preset threshold is specifically limited.

For example, in a certain application scene, the first preset threshold is configured to be 90%, and in a different application scene, the first preset threshold may be adjusted, which will not be described in detail herein.

For another example, in a certain application scene, if the second preset threshold is configured to be 0.005, a range of the compression amount of the size of the target program may be configured to be 0.005-0.899; and in a different application scene, the second preset threshold may be adjusted, which will not be described in detail herein.

For still another example, in a certain application scene, the third preset threshold is configured to be 0.4123, and in a different application scene, the third preset threshold may be adjusted, which will not be described in detail herein.

The delta debugging method adopted in the embodiment of the present application is mainly applied to two application fields, trees and C language programs respectively, for each of which 30 projects are selected, and there are 40 projects in total with 20 of them in duplicate. In the field of trees, the embodiment of the present application uses the HDD algorithm as a basic implementation framework, and this algorithm aims at a program input that can obtain an abstract syntax tree; and in the field of C language programs, the embodiment of the present application uses the CHISEL algorithm as the basic implementation framework, and this algorithm depends on the dependency between C language grammar and program elements. The reason why the above two application fields are used in the embodiment of the present application is that the delta debugging technology is widely used in these two fields and related basic algorithms have relatively mature implementation environments. For the convenience of description, the embodiment of the present application uses d-HDD to refer to the original HDD algorithm (ddmin is used as the delta debugging method, and the ddmin algorithm is a benchmark algorithm of the embodiment of the present application), and uses p-HDD to refer to an HDD algorithm in which a ProbDD algorithm is used instead of the ddmin algorithm. Similarly, the two corresponding versions of CHISEL are called d-CHISEL and p-CHISEL, respectively. The embodiment of the present application also uses d-version and p-version to refer to related algorithms.

The projects used in the embodiment of the present application are all projects used in extensive research. In the field of trees, the embodiment of the present application uses 30 projects, 20 of which are from Perses work. They are C language programs that can trigger GCC and Clang compiler crashes and compilation defects, and the corresponding attribute is to be able to reproduce corresponding compiler defects and there are no undefined behaviors in the C language. In the embodiment of the present application, 1000 XML programs are collected. First, after filtering out 73 XML programs that cannot pass the grammar, 10 XML programs are selected from the remaining XML programs, and the corresponding attribute is to obtain the same coverage on the grammar parser xmllint as the original test. In the field of C language programs, 30 projects are used in the embodiment of the present application, 20 projects of which are consistent with the 20 projects related to the compiler in the tree field. The other 10 projects come from CHISEL work, and the corresponding attribute is to be able to successfully compile and pass the respective specified test cases.

In order to measure the debugging performance of the delta debugging method of the embodiment of the present application during the implementation process, the delta debugging method provided by the embodiment of the present application uses widely used evaluation indicators, that is, the size of the generated result, the processing time, and the number of marks that can be deleted per second. The unit of the size of the result is the number of marks, and the unit of the processing time is second. When executing each project, the time limit specified by the delta debugging method provided by the embodiment of the present application is 3 hours. If a timeout occurs, the delta debugging method provided by the embodiment of the present application will take the result of passing the test for the last time as the finally returned result. Due to the large differences between various projects, the delta debugging method provided by the embodiment of the present application uses a geometric average operator as a method for calculating the average value.

Table 1 shows a comparison result of the delta debugging method provided by the embodiment of the present application and the benchmark algorithm ddmin. The delta debugging method provided by the embodiment of the present application uses d- and p-versions to process each project and records the size and processing time of the corresponding returned result during the implementation process. Subsequently, the delta debugging method provided by the embodiment of the present application calculates the number of marks that can be deleted per second. In addition, the delta debugging method provided by the embodiment of the present application provides the size of the generated result of the project, the processing time and the number of marks that can be deleted per second to the Wilcoxon signed rank test of paired sampling to calculate the p-value, and the value shows whether the delta debugging method provided by the embodiment of the present application has obvious effects and effect improvements compared with the benchmark algorithm.

TABLE 1 comparison of the delta debugging method provided by the embodiment of the present application and ddmin

| | | p-version | | | d-version | | | | | | | | |
|---|---|---|---|---|---|---|---|---|---|---|---|---|---|
| | $R_i$ | $R_p$ | $S_p$ | $T_p$ | $R_d$ | $S_d$ | $T_d$ | $\uparrow_R$ | p-value | xS | p-value | $\uparrow_T$ | p-value |
| Tree | 31,533 | 376 | 9 | 778 | 928 | 4 | 2,115 | 59.48% | 0.0000 | 2.25 | 0.0000 | 63.22% | 0.0015 |
| C | 64,782 | 8,791 | 31 | 874 | 9,935 | 17 | 1,597 | 11.51% | 0.0012 | 1.82 | 0.0000 | 45.27% | 0.0000 |

In this table, R represents the size of the returned result; S represents the number of marks that can be deleted per second; T represents the processing time; $R_i$ represents the size of the input; p represents p-versions; d represents d-versions; ↑ represents improvement, where $\uparrow_x = (X_d - X_p)/X_d$; and $x_S$ represents the speed-up ratio, where $x_S = S_p/S_d$.

In this table, statistics are only made on indicators related to projects that can return results correctly within the time limit.

On average, the delta debugging methods provided by the embodiment of the present application can delete 5 and 14 more marks per second in HDD and CHISEL respectively to obtain 59.48% and 11.51% smaller results. Among the projects that can return results correctly within the time limit, the delta debugging method provided by the embodiment of the present application reduces the processing time on HDD and CHISEL by 63.22% and 45.27%, respectively.

FIG. 3 shows the influence of a unique hyperparameter a on the result in the delta debugging method provided by the embodiment of the present application. In the implementation process, the delta debugging method provided by the embodiment of the present application adjusts the value of the parameter. Due to the timeout phenomenon on some projects, not all projects are adopted in the implementation process, but 14 projects are sampled. The reduction ratio of projects sampled in the process ranges from 0.005 to 0.899. In the two fields, the delta debugging method provided by the embodiment of the present application use 7 items respectively, and the values of a are 0.01, 0.05, 0.1, 0.15, 0.2, 0.25 and 0.3 respectively. It can be concluded from this figure that the parameter a has little effect on the delta debugging method provided by the embodiment of the present application, and the delta debugging method provided by the embodiment of the present application has an effect of improving both the basic algorithms HDD and CHISEL based on the experimental parameter values.

Table 2 shows a comparison result of the delta debugging method provided by the embodiment of the present application and a comparison method of ACTIVECOARSEN algorithm. During the implementation of the delta debugging method provided by the embodiment of the present application, ACTIVECOARSEN is selected as a typical comparison method in the random search field, and default parameters in the algorithm are selected during the implementation. Subsequently, in the delta debugging method provided by the embodiment of the present application, the ddmin algorithm in HDD and CHISEL is replaced with the ACTIVECOARSEN algorithm, and two additional versions, called a-HDD and a-CHISEL respectively, are constructed. In the delta debugging method provided by the embodiment of the present application, a-version and p-version are compared in the implementation of this step.

At the same time, compared with the worst case $O(n^2)$ of the ddmin algorithm, the delta debugging method provided by the embodiment of the present disclosure has a time complexity of $O(n)$ in the worst case.

In the embodiment of the present disclosure, an initial probability model and historical test data are acquired; the initial probability model is optimized and iterated through the historical test data to obtain an optimized and iterated probability model; and based on the optimized and iterated probability model, delta debugging is performed on a target program containing multiple lines of code to obtain a debugging result that meets a first preset condition. Therefore, by adopting the embodiment of the present application, the initial probability model can be continuously optimized and iterated through the historical test data to obtain the optimized and iterated probability model, and the target program can be differentiatedly debugged based on the optimized and iterated probability model, so that the correctness of the debugging result can be improved, or the compression amount of the size of the target program can reach a target compression amount, or the debugging time of the delta debugging of the target program can be greatly reduced.

The following are embodiments of the delta debugging system based on the probability model of the present disclosure, which can be used to implement the embodiments of the delta debugging method based on the probability model of the present disclosure. For details that are not disclosed in the embodiments of the delta debugging system based on the probability model of the present disclosure, reference may be made to the embodiments of the delta debugging method based on the probability model of the present disclosure.

Figure 4:
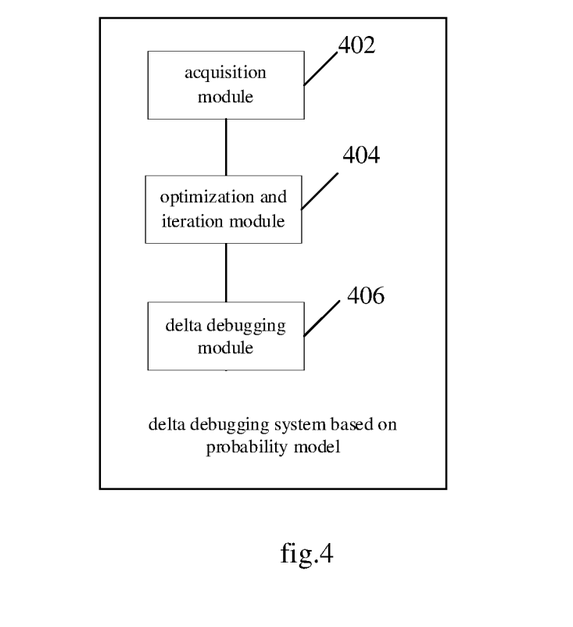
FIG. 4 is a schematic structural diagram of a delta debugging system based on a probability model provided by an embodiment of the present disclosure.

Referring to FIG. 4, a schematic structural diagram of a delta debugging system based on a probability model provided by an exemplary embodiment of the present disclosure is shown. The delta debugging system can be implemented as all or a part of a terminal through software, hardware or a combination of the two. The delta debugging system includes an acquisition module 402, an optimization and iteration module 404, and a delta debugging module 406.

Specifically, the acquisition module 402 is configured to acquire an initial probability model and historical test data;

the optimization and iteration module 404 is configured to optimize and iterate the initial probability model through the

TABLE 2 comparison of the delta debugging method provided by the embodiment of the present application and ACTIVECOARSEN

| | | p-version | | | a-version | | | | | | | | |
|---|---|---|---|---|---|---|---|---|---|---|---|---|---|
| | $R_i$ | $R_p$ | $S_p$ | $T_p$ | $R_a$ | $S_a$ | $T_a$ | $\uparrow_R$ | p-value | xS | p-value | $\uparrow_T$ | p-value |
| Tree | 31,533 | 376 | 9 | 778 | 910 | 6 | 1,887 | 58.68% | 0.0000 | 1.5 | 0.0000 | 58.77% | 0.0015 |
| C | 64,782 | 8,791 | 31 | 874 | 12,597 | 9 | 2,778 | 27.03% | 0.0000 | 3.33 | 0.0000 | 68.65% | 0.0001 |

On average, p-versions significantly surpass a-versions. It can delete 3 and 21 more marks per second in the tree field and C language program field to obtain 58.68% and 27.03% smaller results. Among the projects that can return results correctly within the time limit, the delta debugging method provided by the embodiment of the present application reduces the processing time on HDD and CHISEL by 58.77% and 68.65%, respectively.

historical test data acquired by the acquisition module 402 so that an optimized and iterated probability model is obtained; and the delta debugging module 406 is configured to perform delta debugging on a target program containing multiple lines of code based on the optimized and iterated probability model obtained by the optimization and iteration module 404 so that a debugging result that meets a first preset condition is obtained.

The first preset condition includes:

a correctness of the debugging result is larger than or equal to a first preset threshold; and/or a compression amount of the size of the target program is larger than or equal to a second preset threshold; and/or a reduction amount of a debugging time for delta debugging of the target program is larger than or equal to a third preset threshold.

Optionally, the optimization and iteration module 404 is specifically configured to:

optimize and predict the initial probability model through the historical test data to predict the probability of each element being retained;

select a subset of elements that can maximize the next test revenue based on the initial probability model during each iteration; and test whether the subset meets various preset performances, and update the initial probability model based on a test result if the subset meets the various preset performances.

Optionally, the system further includes:

a simplification module (not shown in FIG. 4), which is configured to: simplify the initial probability model according to preset rules to obtain a simplified probability model, in which the preset rules include a first preset rule associated with the monotonicity of the initial probability model and a second preset rule associated with the certainty of the initial probability model; the first preset rule includes: if a sequence fails the test, then any subsequence of the sequence will fail the test; and the second preset rule includes: if two subsequences of the sequence pass the test, then an intersection of the two subsequences will pass the test.

Optionally, the system further includes:

a reading module (not shown in FIG. 4), which is configured to read the first preset rule and the second preset rule; and a first determination module (not shown in FIG. 4), which is configured to: in a case where the universal set meets the first preset rule and the second preset rule read out by the reading module, determine an optimal subsequence from each subsequence of the sequence.

Optionally, the system further includes:

a first calculation module (not shown in FIG. 4), which is configured to calculate an expected value of test revenue of each subsequence of the sequence; and a second determination module (not shown in FIG. 4), which is configured to determine the subsequence with the maximized expected value of test revenue, calculated by the calculation module, as a target sampling subsequence.

Optionally, the system further includes:

a second calculation module (not shown in FIG. 4), which is configured to calculate a posterior probability based on historical test results; and a third determination module (not shown in FIG. 4), which is configured to determine a second preset condition for updating the initial probability model according to the posterior probability calculated by the second calculation module, in which the second preset condition determined by the third determination module includes a preset condition for sampling and a preset condition for testing.

It should be noted that when the delta debugging method based on the probability model is executed by the delta debugging system based on the probability model provided by the above embodiment, only the division of the above functional modules is used as an example. In actual applications, allocation of the above functions may be completed by different function modules as required, that is, an internal structure of the device is divided into different function modules to complete all or part of the functions described above. In addition, the delta debugging system based on the probability model provided by the above embodiment belongs to the same concept as the embodiment of the delta debugging method based on the probability model. For details of the implementation process, reference may be made to the embodiment of the delta debugging method based on the probability model, and a detailed description is omitted herein.

In the embodiment of the present disclosure, the acquisition module is configured to acquire an initial probability model and historical test data; the optimization and iteration module is configured to optimize and iterate the initial probability model through the historical test data acquired by the acquisition module so that an optimized and iterated probability model is obtained; and the delta debugging module is configured to perform delta debugging on a target program containing multiple lines of code based on the optimized and iterated probability model obtained by the optimization and iteration module so that a debugging result that meets a first preset condition is obtained. Therefore, by adopting the embodiment of the present application, the initial probability model can be continuously optimized and iterated through the historical test data to obtain the optimized and iterated probability model, and the target program can be differentiatedly debugged based on the optimized and iterated probability model, so that the correctness of the debugging result can be improved, or the compression amount of the size of the target program can reach a target compression amount, or the debugging time of the delta debugging of the target program can be greatly reduced.

In an embodiment, a computer device is proposed, which includes a memory, a processor, and a computer program that is stored on the memory and can run on the processor. When the computer program is executed by the processor, the following steps are implemented: acquiring an initial probability model and historical test data; optimizing and iterating the initial probability model through the historical test data to obtain an optimized and iterated probability model; and performing delta debugging on a target program containing multiple lines of code based on the optimized and iterated probability model to obtain a debugging result that meets a first preset condition.

In an embodiment, a storage medium having computer-readable instructions stored thereon is proposed. When the computer-readable instructions are executed by one or more processors, the one or more processors execute the following steps: acquiring an initial probability model and historical test data; optimizing and iterating the initial probability model through the historical test data to obtain an optimized and iterated probability model; and performing delta debugging on a target program containing multiple lines of code based on the optimized and iterated probability model to obtain a debugging result that meets a first preset condition.

Those skilled in the art can understand that all or part of the processes in the above method embodiment may be completed by relevant hardware instructed by a computer program. The computer program may be stored in a computer readable storage medium. When executed, the program may include the processes of the embodiments of the above various methods. The aforementioned storage medium may be a non-volatile storage medium such as a magnetic disk, an optical disk, a read-only memory (ROM), or a random access memory (RAM), etc.

The technical features of the above embodiments may be combined arbitrarily. In order to make the description concise, not all possible combinations of the technical features in the above embodiments are described. However, the combination should be considered as falling within the range recorded in this specification as long as there is no contradiction in the combination of these technical features.

The above embodiments only show several implementations of the present disclosure, and the descriptions are relatively specific and detailed, but they should not be understood as a limitation to the patent scope of the present disclosure. It should be pointed out that for those skilled in the art, several modifications and improvements can also be made without departing from the concept of the present disclosure, and these modifications and improvements all fall within the scope of protection of the present disclosure. Therefore, the scope of protection of the present disclosure shall be subject to the appended claims.

The invention claimed is:

1. A delta debugging method based on a probability model, the method comprising:
    acquiring an initial probability model and historical test data;
    simplifying the initial probability model according to preset rules to obtain a simplified probability model, the preset rules comprising:
        a first preset rule associated with a monotonicity of the initial probability model, the first preset rule comprising: if a sequence fails a test, then any subsequence of the sequence will fail the test; and
        a second preset rule associated with a certainty of the initial probability model, the second preset rule comprising: if two subsequences of the sequence pass the test, then an intersection of the two subsequences will pass the test,
    optimizing and iterating the initial probability model through the historical test data to obtain an optimized and iterated probability model; and
    performing delta debugging on a target program containing multiple lines of code based on the optimized and iterated probability model to obtain a debugging result that meets a first preset condition.

2. The method according to claim 1, wherein the first preset condition comprises:
    a correctness of the debugging result is larger than or equal to a first preset threshold; and/or
    a compression amount of a size of the target program is larger than or equal to a second preset threshold; and/or
    a reduction amount of a debugging time for delta debugging of the target program is larger than or equal to a third preset threshold.

3. The method according to claim 1, wherein the optimizing and iterating the initial probability model through the historical test data comprises:
    optimizing and predicting the initial probability model through the historical test data to predict a probability of each element being retained;
    selecting a subset of elements that can maximize a next test revenue based on the initial probability model during each iteration; and
    testing whether the subset meets various preset performances, and updating the initial probability model based on a test result if the subset meets the various preset performances.

4. The method according to claim 1, further comprising:
    reading the first preset rule and the second preset rule; and
    in a case where a universal set meets the first preset rule and the second preset rule, determining an optimal subsequence from each subsequence of the sequence.

5. The method according to claim 1, further comprising:
    calculating an expected value of test revenue of each subsequence of the sequence; and
    determining the subsequence with a maximized expected value of test revenue as a target sampling subsequence.

6. The method according to claim 1, further comprising:
    calculating a posterior probability based on historical test results; and
    determining a second preset condition for updating the initial probability model according to the posterior probability, wherein the second preset condition comprising a preset condition for sampling and a preset condition for testing.

7. A delta debugging system based on a probability model, the system comprising:
    one or more processors configured to:
        acquire an initial probability model and historical test data;
        simplify the initial probability model according to preset rules to obtain a simplified probability model, the preset rules comprising:
            a first preset rule associated with the monotonicity of the initial probability model, the first preset rule comprising: if a sequence fails the test, then any subsequence of the sequence will fail the test, and
            a second preset rule associated with the certainty of the initial probability model, the second preset rule comprising: if two subsequences of the sequence pass the test, then an intersection of the two subsequences will pass the test;
        optimize and iterate the initial probability model through the historical test data acquired by the acquisition module so that an optimized and iterated probability model is obtained; and
        perform delta debugging on a target program containing multiple lines of code based on the optimized and iterated probability model obtained by the optimization and iteration module so that a debugging result that meets a first preset condition is obtained.

8. A computer device, comprising a memory and a processor, wherein computer-readable instructions are stored in the memory, and when the computer-readable instructions are executed by the processor, the processor is caused to execute the steps of the delta debugging method according to claim 1.

9. A non-transitory storage medium having computer-readable instructions stored thereon, wherein when the computer-readable instructions are executed by one or more processors, the one or more processors are caused to execute the steps of the delta debugging method according to claim 1.

* * * * *